United States Patent [19]

Saeki et al.

[11] 4,016,098

[45] Apr. 5, 1977

[54] PROCESS FOR HARDENING MICROCAPSULES

[75] Inventors: Keiso Saeki; Hiroharu Matsukawa, both of Fujimiya, Japan

[73] Assignee: Fuji Photo Film Co., Ltd., Minami-ashigara, Japan

[22] Filed: Dec. 13, 1974

[21] Appl. No.: 532,573

[30] Foreign Application Priority Data

Dec. 13, 1973 Japan .............................. 48-140965

[52] U.S. Cl. .............................. 252/316; 252/299; 252/522; 282/27.5; 424/35; 427/338
[51] Int. Cl.$^2$ .......................................... B01J 13/02
[58] Field of Search ..................... 252/316; 424/35; 427/338

[56] References Cited

UNITED STATES PATENTS

| 2,824,092 | 2/1958 | Thompson ..................... 252/316 X |
| 2,886,445 | 5/1959 | Rosenthal et al. ............... 426/89 X |
| 3,687,865 | 8/1972 | Katayama et al. ................. 252/316 |

Primary Examiner—Richard D. Lovering
Attorney, Agent, or Firm—Sughrue, Rothwell, Mion, Zinn & Macpeak

[57] ABSTRACT

In a process for producing microcapsules which comprises microencapsulating hydrophobic oil droplets by complex coacervation using at least two hydrophilic colloids having opposite electric charges and being ionizable in water with at least one of the colloids being gellable, the improvement comprising hardening the coacervate wall by the presence of an oxidation product of a polysaccharide as a hardening agent and adjusting the pH.

12 Claims, No Drawings

PROCESS FOR HARDENING MICROCAPSULES

BACKGROUND OF THE INVENTION

1. Field of the Invention

The present invention relates to an "environmental pollution-free" process for hardening the walls of hydrophobic oil-containing capsules in which the walls comprise a hydrophilic colloid complex coacervate. More particularly, it is concerned with a process for hardening the walls of hydrophobic oil-containing capsules using as a hardener an oxidation product of a polysaccharide harmless to animals and humans in order to improve the physical properties of the coacervate wall, in the production of microcapsules employing a coacervation process using at least one hydrophilic colloid which is gellable.

2. Description of the Prior Art

Formaldehyde, glyoxal and glutaraldehyde are well known as hardeners for gelatin walls. However, the use of these aldehydes (in particular, formaldehyde) can be the cause of serious environmental pollution due to their toxicity, stimulative property, etc. In addition, microcapsule walls prepared by using these aldehydes have the defects that their impermeability is poor, they are weak in strength and they are affected by humidity to a great extent.

When oil-containing capsules prepared according to these processes are used for pressure-sensitive recording papers, the following defects exist.

That is, the microcapsule wall is poor in impermeability as shown by subjecting the microcapsules to a water immersion coloring test where the degree of coloration on a color developer sheet is too high. In the water immersion coloring test a color former containing microcapsule sheet and a color developer sheet are immersed for 5 seconds in water with the coated surfaces of the two sheets facing each other, drying in the air and evaluating the degree of coloration on the color developer sheet. Also, since the strength of the microcapusle wall is weak, the microcapsules are easily ruptured by a slight external pressure, which reduces the workability of the microcapsules in handling for processing and printing. Furthermore, since the microcapsule wall is deteriorated by humidity, when pressure-sensitive recording papers are stored under an atmosphere of high humidity, various properties of the pressure-sensitive recording papers are degraded.

SUMMARY OF THE INVENTION

Therefore, an object of the present invention is to provide a hardening process which enables microcapsules which possess (1) high impermeability, (2) high strength and (3) high resistance against influence of humidity to be produced.

Another objects of the present invention is to provide an "environmental pollution-free" process for hardening microcapsules.

It has now been found that the above-described objects can be effectively attained in microencapsulating hydrophobic oil droplets by complex coacervation using at least two hydrophilic colloids having opposite electric charges and being ionizable in water with at least one of the colloids being gellable by using as a hardener an oxidation product of a polysaccharide in the "hardening step" of the coacervate wall conducted in the presence of hardener and the adjustment of pH to the alkali side (for example, a pH of about 7 to 13).

DETAILED DESCRIPTION OF THE INVENTION

The hardening process of the present invention is described in detail below.

Microencapsulating hydrophobic oil droplets through complex coacervation is well known as a typical process for producing microcapsules, for example, as disclosed in U.S. Pat. No. 2,800,457.

The conventional process comprises the following steps.

In the present invention, are used as a coacervate-forming colloid at least two hydrophilic colloids having opposite electric charges and being ionizable in water with at least one of the colloids being gellable.

That is, the conventional process comprises (1) adding under stirring a hydrophobic oily solution, which is to be microencapsulated, to an aqueous solution of at least one hydrophilic colloid ionizable in water to emulsify and form an o/w type emulsion and admixing, with the above-described emulsion solution, an aqueous solution of at least one hydrophilic colloid which is ionizable in water and which has an opposite electric charge to the above-described hydrophilic colloid; or adding the oily solution to an aqueous solution of at least two hydrophilic colloids having opposite electric charges and then stirring the mixture to emulsify (the emulsifying step), (2) causing coacervation around the emulsified oil droplets by adding water to the resulting emulsion and/or adjusting the pH (the coacervation step), (3) cooling the coacervate wall to cause gelation thereof (the gellation step) and (4) adding alkali (e.g., sodium hydroxide, potassium hydroxide, etc.) in the presence of a hardener to adjust the pH to the alkali side (the hardening step), i.e., adding the hardener and subsequently adjusting the pH, adjusting the pH and subsequently adding the hardener, or simultaneously adding the hardener and adjusting the pH. In order to render the thus obtained microcapsule wall heat resistant, the microcapsules are left for a long period of time at a low temperature or, when this step is desired to be conducted in a short time, the microcapsules are heated to, for example, about 40° to 60° C (this temperature range being merely illustrative and not limiting).

As the coacervate-forming hydrophilic colloid, natural or synthetic hydrophilic colloids can be used. For example, gelatin, saccharides (e.g., agar-agar, casein, alginate, etc.), gums (e.g., gum arabic, carrageenan, etc.), maleic anhydride copolymers, e.g., with monomers having at least one addition polymerizable unsaturated bond (e.g., acrylamides, styrenes, vinyl ethers (e.g., methyl vinyl ether, etc.), olefins (e.g., ethylene, isobutylene, etc.), vinyl compounds, etc.), can be used.

Whether the hydrophilic colloid to be used possesses a positive or a negative charge is relative. For example, where gelatin is used, gelatin has a positive charge and the other hydrophilic colloid (as given above) used has a negative charge.

Typical examples of suitable materials for the nucleus of the individual microcapsules are natural mineral oils, animal oils, vegetable oils, and synthetic oils, and the like. Suitable mineral oils are exemplified by petroleum and its fractions, for example kerosene, gasoline, naphtha, and paraffinic oils. Examples of animal oils are fish oils, and lard oil. Suitable vegetable oils are peanut oil, linseed oil, soybean oil, castor oil, and corn oil. Suitable synthetic oils are biphenyl compounds (e.g., isopropylbiphenyl, isoamylbiphenyl, for example, as disclosed in U.S. Patent Application 174,518, filed Aug. 24, 1971, and now abandoned), terphenyl compounds (e.g., as disclosed in German Patent O.L.S. 2,153,635), phosphoric acid compounds (e.g., triphenylphosphate, etc.), naphthalene compounds (e.g., as disclosed in German Patent OLS 2,141,194), methane compounds (e.g., as disclosed in German Patent OLS 2,153,634), phthalic acid compounds (e.g., diethyl phthalate, dibutyl phthalate, dioctyl phthalate, etc.), salicylic acid compounds (e.g., ethyl salicylate, etc.), and the like. Agricultural chemicals, medicines, perfumes, adhesives, liquid crystals, foods, detergents, dyes, catalysts, enzymes, rust inhibitors, etc. can be appropriately incorporated in these natural mineral oils, animal oils and synthetic oils.

In order to emulsify and disperse the hydrophobic oily liquid which is converted to the nucleus material in water, an anionic, cationic or nonionic surface active agent (e.g., saponin, an alkylarylsulfonate (e.g., sodium alkylbenzenesulfonate), as disclosed in U.S. Pat. Nos. 2,600,831, 3,068,101, 3,415,649, 3,133,816, etc.) is preferably used to prevent a phase inversion or the formation of a water-in-oil type (w/o) emulsion.

The oxidation product of the polysaccharide of the present invention is obtained by converting the seconary alcohol groups contained in the saccharide units forming the polysaccharide to aldehyde groups through oxidation using an aqueous solution of an oxidizing agent such as periodic acid, a salt of periodic acid (e.g., the alkali metal (Na, K, etc.) salts) or a like inorganic peroxide, preferably at room temperature (e.g., about 20° to 30° C) for 2 to 3 days (the oxidation ratio being preferably not less than about 20%), followed by separation, washing and drying, for example, as disclosed in U.S. Pat. No. 3,057,723, and British Patents 891,221 and 928,591.

In the present invention, the oxidation product of the polysaccharide is added in an amount sufficient to harden the complex coacervate. This amount can be appropriately decided using a conventional hardening test. In general, the amount is necessarily not less than at least about 3% by weight based on the amount of gellable colloid used, preferably not less than 5% by weight. A suitable amount of the oxidation product of the polysaccharide of the present invention can range from about 3 to 200% by weight, preferably 5 to 100% by weight, more preferably 10 to 80% by weight based on the weight of the gellable colloid, such as gelatin.

As the examples of polysaccharides whose secondary alcohol groups can be oxidized to aldehyde groups, there are illustrated homoglycans such as glucans (e.g., cellulose, carboxymethyl cellulose, methyl cellulose, cellulose sulfate, starch, carboxymethyl starch, sulfated starch, glycogen, charonin, laminarin, dextran, etc.), fructans (e.g., inulin, levan, etc.), mannans (e.g., Phytelephas macrocarpa mannan, etc.), xylans (e.g., xylan of straw, etc.), galacturonans (e.g., pectic acid, pectin, amylopectin, etc.), mannuronans (e.g., alginic acid, etc.), N-acetylglucosamine derivatives (e.g., chitin, etc.), etc., heteroglycans such as diheteroglycans (e.g., chondroitin sulfuric acid, hyaluronic acid, guaran, mannan of devil's tongue, heparin, etc.), triheteroglycans (e.g., mesquite gum, ghatti gum, tragacanth gum, etc.), tetraheteroglycans (e.g., sum arabic, etc.), and the like.

The process for oxidizing the polysaccharides to aldehyde derivatives is described below. Unless otherwise indicated, all parts, percents, ratios and the like are by weight.

SYNTHESIS EXAMPLE 1

500 ml of distilled water and 11.5 g of periodic acid were placed in a 1-liter three-necked flask equipped with a magnetic stirrer, a thermometer and a cooling bath (5° C). This mixture was stirred to form a uniform solution and cooled to 20° C. Then, 50 g of gum arabic was added thereto and stirred to form a uniform solution. After the reaction solution temperature increased to 35° C, the system was cooled externally to 20° C. The reaction was continued for 23 hours under stirring.

The resulting reaction mixture was poured nto 5 liters of tert-butyl alcohol. The precipitate formed was filtered out using a Buchner funnel and repeatedly washed with ethanol until iodic acid was removed. The washed product was dried at 40° C for 18 hours under reduced pressure. Thus, 46 g of a white powder of aldehyde-gum arabic was obtained with the oxidation ratio of 57%.

SYNTHESIS EXAMPLE 2

148 ml of a 0.05 M aqueous solution of sodium periodate was added to 2.1 g of amylopectin. After reacting for 24 hours at room temperature in the dark, the reaction mixture was poured into 2 liters of acetone to obtain a precipitate. The thus obtained product was washed with a mixed solution of acetone/water (1:1 by volume) until sodium iodate, a reaction by-product, was completely removed. Then, the product was dried under reduced pressure to obtain 1.4 g of solid aldehyde-amylopectin with an oxidation ratio of 49%.

SYNTHESIS EXAMPLE 3

158 ml of a 0.2 M aqueous solution of sodium periodate was added to 16.8 g of cellulose sulfate. After reacting for 24 hours at room temperature, the reaction mixture was poured into 3 liters of acetone to obtain a precipitate. The thus formed product was washed with a mixed solution of acetone/water (7:3 by volume), followed by drying under reduced pressure. Thus, 9.7 g of aldehydecellulose sulfate powder was obtained with an oxidation ratio of 40%.

SYNTHESIS EXAMPLE 4

276 ml of a 0.1 M aqueous solution of periodic acid was added to 20.3 g of corn starch and reacted with each other for 8 hours. This reaction mixture was poured into 2 liters of acetone, and the resulting product was washed with ethanol, followed by drying under reduced pressure. Thus, 14.7 g of aldehyde-starch white powder was obtained with an oxidation ratio of 85%.

SYNTHESIS EXAMPLE 5

20 g of laminarin was suspended in 500 ml of water, and 25.5 g of a 50% periodic acid aqueous solution was added thereto, followed by stiring for 19 hours to react. The thus obtained product was filtered out and washed well with water and methanol. Upon drying under reduced pressure, 15,3 g of aldehyde-laminarin slightly yellow powder was obtained with an oxidation ratio of 68%.

SYNTHESIS EXAMPLE 6

23.7 g of alginic acid was dispersed in 700 ml of water and, while maintaining the temperature not higher than 15° C, 125 g of a 25% periodic acid aqueous solution was gradually added dropwise thereto, followed by stirring for 90 hours at 20° C. The thus obtained solid was separated by decantation, and washed with water to remove iodide ion. Finally, the solid was washed with ethanol and dried under reduced pressure to obtain 13.3 g of aldehyde-alginic acid white powder with an oxidation ratio of 35%.

The microencapsulation process utilizing complex coacervation possesses the defect that prehardening processing step (the step to be conducted after the completion of gellation and before the completion of the addition of the hardener and the adjustment of pH to the alkali side) takes a long time. This is because the viscosity of the system containing a hardener would otherwise sharply increase when the pH of the system becomes around the isoelectric point of the gelatin upon adjusting the pH to the alkali side, resulting in agglomeration (such phenomenon being called "shock"). It is useful to combine the present invention with the process described in U.S. Pat. No. 3,687,865, German Patent OLS Nos. 2,133,052 and 2,138,842, etc. removing the defect. That is, the adjustment of pH to the alkali side can be effected in a shorter time by adding a hardener for gelatin (an oxidation product of saccharide) and a "shock-preventing agent" in the prehardening processing step.

Also, the present invention can be combined with the addition of a "coacervation-causing agent" (e.g., as described in German Patent OLS Nos. 2,135,680, and 2,210,367, and U.S. Pat. No. 3,840,467, etc.). Thus microcapsules whose walls are thick and have low permeability can be produced. Microcapsules obtained by such a process are particularly suitable as microcapsules for pressure-sensitive papers.

As has been described, the present invention is extremely useful for the production of microcapsules.

As a result of using an oxidation product of a polysaccharide of the present invention as a hardener for a complex coacervate deposited around fine oil droplets of a hydrophobic oily solution, microcapsules having high impermeability, great elasticity and high resistance against humidity can be obtained.

The present invention will now be illustrated in greater detail by reference to the following Examples which, however, are not intended to be construed as limiting the present invention in any way.

In the present invention, the heat resistance of microcapsules was evaluated as follows. That is, a color former for a pressure sensitive copying paper was dissolved in an oil which was microencapsulated and, after coating the microcapsules formed on a paper, the sample was placed in a hot air drying box to test the heat resistance. Then the sample in contact with a clay-coated paper as a developer for the color former was examined whether the coated surface of the clay-coated paper was colored or not when superposed on the microcapsule-coated surface.

The clay-coated paper was prepared as follows.

100 parts of an activated, sulfuric acid-processed acid clay was dispersed in 300 parts of water containing 6 parts of a 40% by weight sodium hydroxide aqueous solution and 0.5 part of sodium hexametaphosphate using a Kody mill. To this was added 4 parts of Aron 20LL (trade name of sodium polyacrylate, produced by Toa Gosei Chemical Industry Co., Ltd.) and mixed. Then, 35 parts of Dow Latex 636 (trade name of a styrene-butadiene latex produced by Dow Chemical Co.) was further added thereto.

This solution was air knife-coated on a 50 g/m² paper in an amount of 8.0 g/m² (on a solids basis), and super-calendered in order to increase the smoothness of the surface. Thus, a clay-coated paper having a smoothness of 120 seconds (measured using a Beck smoothness-measuring meter) was obtained.

EXAMPLE 1

6 parts of acid-processed pigskin gelatin having an isoelectric point of 8.2 and 6 parts of gum arabic were dissolved in 30 parts of warm water at 40° C, and 0.2 part of sodium nonylbenzenesulfonate was added as an emulsifier.

Then, 30 parts of diisopropylnaphthalene containing dissolved therein 2.5% by weight of crystal violet lactone and 2.0% by weight of benzoyl leucomethylene blue was added to the above-described colloid solution under vigorous stirring for emulsification to form an o/w type emulsion. The stirring was discontinued with the size of the oil droplets became 6 to 10 $\mu$. 200 parts of warm water at 40° C was added thereto. A 20% aqueous acetic acid solution was added dropwise thereto, while continuing the stirring, to adjust the pH to 4.4. The colloid wall accumulated around the oil droplets was gelled by cooling from the outside of the vessel while continuing the stirring. 20 parts of a 5% aqueous solution of the hardener obtained in Synthesis Example 1 was added under stirring when the liquid temperature reached 10° C. Further, 20 parts of an aqueous solution (7% by weight) of the sodium salt of carboxymethyl cellulose (etherification degree: 0.75) was added thereto as a shock-preventing agent. then, a 10% by weight sodium hydroxide aqueous solution was added dropwise thereto until the system reached a pH of 10, and the temperature of the system was increased from outside of the vessel and maintained for 1 hour at 40° C to obtain a color former-containing microcapsules.

The microcapsules obtained in this Example are useful as microcapsules for pressure-sensitive copying papers. For example, a coated paper was prepared by adding 10 parts of a 10% aqueous solution of PVA-210 (trade name of polyvinyl alcohol, made by Kuray) and 3 parts of corn starch to 100 parts of the resulting capsule slurry and coating on a 50 g/m² paper in an amount of 5.5 g/m², followed by drying. On the other hand, a coated paper for comparison (Comparative Example 1) was prepared by adding 10 parts of a 10% solution of PVA-210 and 3 parts of corn starch to 100 parts of a capsule slurry (obtained in the same manner as described above except for using 2.0 parts of a 37% formaldehyde solution in place of the compound in Synthesis Example 1) and coating on a 50 g/m² paper in an amount of 5.5 g/m². The characteristics of the two papers were compared to obtain the results given in Table 1.

It can be seen from these results that the strength of the capsule wall, impermeability and humidity resistance are markedly improved.

Table 1

| Comparative Data on Characteristics of Capsule Wall | | |
|---|---|---|
| | Color Density | |
| | Example 1 | Comparative Example 1 |
| Strength of Capsule Wall: | | |
| Pressure Resistance | 0.13 | 0.15 |
| Friction Resistance | 0.09 | 0.12 |
| Humidity Resistance | 0.33 | 0.40 |
| Permeability of Wall: | | |

Table 1-continued

| | Comparative Data on Characteristics of Capsule Wall | |
|---|---|---|
| | Color Density | |
| | Example 1 | Comparative Example 1 |
| 1. | 0.15 | 0.28 |
| 2. | 0.17 | 0.29 |

The smaller the color density, the better.

TESTING METHOD

Pressure Resistance:

The microcapsule-coated side of the microcapsule-coated paper and the clay-coated surface of the clay-coated paper were faced toward each other and a load of 40 kg/cm$^2$ was applied to the assembly for 30 seconds to measure the color density on the clay-coated surface using a reflection-type spectrophotometer (measurement wave-length: 605 $\mu$).

Friction Resistance:

The microcapsule-coated side of the microcapsule-coated paper and the clay-coated surface of the clay-coated paper were faced toward each other and the clay-coated surface was rotated at a rotation rate of 30 rpm and at a linear velocity of 1 m/min while applying a load of 200 g/cm$^2$ and the density of the colored mark formed was measured using a spectrophotometer.

Humidity Resistance:

The microcapsule-coated side of the microcapsule-coated paper and the clay-coated side of the clay-coated paper were faced toward each other and left for 24 hours at 50° C and 100% RH while applying a load of 200 g/cm$^2$. Then, the color density formed on the clay-coated side was measured using a spectrophotometer.

Permeability of Capsule Wall:

1. The microcapsule-coated side of the microcapsule-coated paper and the clay-coated side of the clay-coated paper were faced toward each other and superposed one over the other with water therebetween and, after air-drying at room temperature, the color density on the clay-coated surface was measured using a spectrophotometer.

2. A clay slurry was coated on the microcapsule-coated side of the microcapsule-coated paper and the fog density after drying was measured using a spectrophotometer.

EXAMPLE 2

6 parts of acid-processed pigskin having an isoelectric point of 9.2 was dissolved in 25 parts of water at 40° C. To this was continuously added 45 parts of a color former oil having the following formulation with stirring to prepare an o/w emulsion containing emulsified droplets of a particle size of 10 to 12 $\mu$.

| Composition of the Color Former Oil: | | |
|---|---|---|
| Crystal Violet Lactone | 0.25 | part |
| 3-Methyl-2,2'-Spiro-bi(benzo-[f]chromene | 0.5 | part |
| 7-N,N-Diethylamino-3-(N,N-diethylamino)fluoran | 7.5 | parts |
| Rhodamine-B-(p-nitroanilino)-lactam | 0.5 | part |
| 7-Diethylamino-2,3-dimethylfluoran | 2.5 | parts |
| Benzoyl Leucomethylene Bue | 2.0 | parts |
| Monoisopropylbiphenyl | 70 | parts |
| Kerosene | 16 | parts |

Then, the emulsion was dispersed in 150 parts of warm water at 40° C under stirring. The subsequent encapsulation steps were all conducted under effective stirring. To this dispersion were added 35 parts of a 10% gum arabic aqueous solution and 10 parts of a 5% styrene-maleic anhydride copolymer sodium salt aqueous solution (tradename: Scripset 500; made by Monsanto Chemical Co.). Then, the pH of the system was adjusted to 4.5 by adding dropwise a 10% aqueous solution of citric acid, and the system was cooled from outside the vessel to cause formation and gellation of the capsule wall. After cooling the liquid to 8° C, 4.5 parts of a 10% aqueous solution of the hardener obtained in Synthesis Example 2 was added thereto. After mixing for 2 minutes, a mixture of 1 part of a 20% polyacrylic acid aqueous solution, 6 parts of a 20% aqueous solution of methylnaphthalenesulfonic acid-formaldehyde condensate sodium salt and 12 parts of a 10% aqueous solution of carboxymethyl starch (etherification degree: 0.5) was added thereto. Then, a 10% sodium hydroxide aqueous solution was added thereto to adjust the pH to 9.6, and the system was heated from outside the vessel to 40° C and maintained at the same temperature for 30 minutes. Thus, color former-containing microcapsules were obtained.

The thus obtained microcapsules are useful for pressure-sensitive copying papers. For example, 10 parts of a 20% acetylated starch aqueous solution, 4 parts of wheat starch (mean particle size: 18 $\mu$) and 4 parts of Avicel (trade name of finely crystalline cellulose, produced by Asahi Chemical Industry Co., Ltd.) were added to 100 parts of the resulting capsule slurry, and coated on a 50 g/m$^2$ paper in an amount of 5.5 g/m$^2$, followed by drying.

This microcapsule coated paper formed a black color when used with a clay-coated paper.

Further, to a capsule slurry obtained by using a mixture of 0.5 part of 40% glyoxal and 0.5 part of 37% formaldehyde in place of the compound of Synthesis Example 2 were added the above-described additives in the same proportions and coated on a 50 g/m$^2$ paper in an amount of 5.5 g/m$^2$, followed by drying. Thus, a comparative coated paper (Comparative Example 2) was obtained.

The characteristics of both papers are shown in Table 2.

Table 2

| Data on Characteristics of Capsule Wall | | |
|---|---|---|
| | Color Density | |
| | Example 2 | Comparative Example 2 |
| Strength of Capsule Wall: | | |
| Pressure Resistance | 0.12 | 0.14 |
| Friction Resistance | 0.08 | 0.10 |
| Humidity Resistance | 0.30 | 0.38 |
| Permeability of Capsule Wall: | | |
| 1. | 0.12 | 0.25 |

Table 2-continued

| Data on Characteristics of Capsule Wall | | |
|---|---|---|
| | Color Density | |
| | Example 2 | Comparative Example 2 |
| 2. | 0.14 | 0.26 |

From the above results, it can be seen that the present invention can provide microcapsules excellent in capsule wall strength, impermeability and humidity resistance.

EXAMPLE 3 a hydrophobic oily solution prepared by dissolving 1 part of crystal violet lactone in 40 parts of phenylcyclohexane was added to an aqueous solution comprising 10 parts of gum arabic and 60 parts of warm water to prepare an oil-in-water type emulsion containing oil droplets of a size of 8 to 11 $\mu$. Then, aqueous solution prepared by dissolving 10 parts of acid-processed gelatin having an isoelectric point of 8.0 in 80 parts of a 40° C warm water was added thereto, and 50% acetic acid aqueous solution was added thereto under constant stirring to adjust the pH to 4.5. Then, 250 parts pf a 40° C warm water was added thereto to cause coacervation. The system was cooled from outside the vessel while continuing the stirring to solidify the colloid deposited around the oil droplets. when the liquid temperature reached 10° C, 40 parts of a 10% carboxymethyl cellulose sodium salt aqueous solution was added, and then a 10% sodium hydroxide aqueous solution was added thereto to adjust the pH to 11. Thereafter, 24 parts of a 5% aqueous solution of the compound obtained in Synthesis Example 3 was added dropwise thereto. In order to complete the hardening of the capsule wall and obtain microcapsules excellent in heat resistance, stirring was continued for 2 days, during which the liquid temperature was allowed to increase naturally to 25° c.

The thus obtained microcapsules are useful for pressure-sensitive copying papers. For example, 6 parts of wheat starch (particle size: 15 $\mu$) and 40 parts of a 10% aqueous solution of oxidized starch were added to 100 parts of the resulting capsule slurry, and coated on a 50 g/m² paper in an amount of 6.0 g/m², followed by drying.

Further, to a capsule solution obtained by using 3.0 parts of 25% glutaraldehyde in place of the compound obtained in Synthesis Example 3 were added the above-described additives in the same proportions, and coated on a 50 g/m² paper in an amount of 6.0 g/m², followed by drying. (Comparative Example 3)

The results obtained on evaluating the papers produced are shown in Table 3 below.

From these results, it can be seen that the capsule coated paper of the invention were superior to those of the comparative example.

EXAMPLE 4

A hydrophobic oily solution prepared by mixing 40 parts of diisopropylbiphenyl with 5 parts of Emerald Jasmine Y-1514E (trade name of perfume oil, made by Ogawa Koryo K.K.) was added to an aqueous solution comprising 8 parts of gum arabic and 60 parts of warm water to prepare an oil-in-water type emulsion containing oil droplets of a size of 20 to 25 $\mu$. Then, an aqueous solution prepared by dissolving 10 parts of acid-processed gelatin having an isoelectric point of 8.2 in 80 parts of a 40° C warm water was added, and a 40% acetic acid aqueous solution was added thereto under constant stirring to adjust the pH to 4.4. Then, the solution it was added to 220 parts of warm water at 40° C to cause coacervation. The system was cooled from outside the vessel, while continuing the stirring, to solidify the colloid deposited around the oil droplets. When the liuqid temperature reached 10° C, 10 parts of a 10% aqueous solution of the hardener obtained in Synthesis Example 4 was added, and then 40 parts of a 10% carboxymethyl starch aqueous solution was added thereto. Then, in order to increase the hardening effect, a 10% sodium hydroxide aqueous solution was added dropwise thereto to adjust the pH to 10. Further, the liquid temperature was increased to 50° C.

The thus obtained perfume oil-containing microcapsules were coated on a paper and left for 2 months in a room. When the microcapsules were ruptured and the smell was examined, they smelled just the same as before storage. Thus, it was confirmed that the microcapsules were excellent in impermeability.

EXAMPLE 5

6 parts of acid-processed whale gelatin having an isoelectric point of 8.8, 4 parts of gum arabic and 0.5 part of carboxymethyl starch (potato starch; etherification degree: 0.4) were dissolved in 30 parts of warm water at 40° C. In this was emulsified a liquid crystal composition comprising 3 parts of methoxybenzylidene-p-n-butylaniline, 5 parts of cholesteryl chloride, 30 parts of cholesteryl nonylate and 4 parts of cholesteryl cinnamate using a pipeline homomixer, to thereby prepare an o/w emulsion of a oil droplet size of 6 to 25 $\mu$. To this was added 175 parts of warm water at 35° C and, further, 1 part of a resoltype phenol resin (resor- Table 3

| | Color Density | |
|---|---|---|
| | Example 3 | Comparative Example 3 |
| Strength of Capsule Wall: | | |
| Pressure Resistance | 0.13 | 0.16 |
| Friction Resistance | 0.09 | 0.14 |
| Humidity Resistance | 0.30 | 0.42 |
| Permeability of Capsule Wall: | | |
| 1. | 0.13 | 0.27 |
| 2. | 0.15 | 0.30 | cin-modified phenol-formaldehyde condensate resin) was added thereto under stirring. Further, a 10% adipic acid aqueous solution was added dropwise thereto to adjust the pH to 4.5. The system was cooled to 8° C from outside the vessel to accelerate colloid deposition and gellation. Stirring was continued.

15 parts of a 10% carboxymethyl cellulose sodium salt solution(etherification degree: 0.78) was poured thereinto, and 30 parts of a 5% aqueous solution of the hardener obtained in Synthesis Example 5 was added thereto, followed by adding dropwise a 10% sodium hydroxide aqueous solution to adjust the pH to 10. Then, the liquid temperature was increased to 40° C to obtain liquid crystal-containing microcapsules.

EXAMPLE 6

An oily solution prepared by dissolving 2 parts of crystal violet lactone in 30 parts of diisopropylnaphthalene was emulsified in a colloid solution comprising 4 parts of gum arabic and 25 parts of warm water to prepare an o/w emulsion. The stirring was discontinued when the maximum oil droplet size became 8 μ. This was then added to a gelatin aqueous soltuion comprising 6 parts of acid-processed gelatin having an isoelecric point of 7.8 and 170 parts of warm water at 45° C. A 50% acetic acid aqueous solution was added thereto under stirring to adjust the pH to 4.5. While continuing the slow stirring, the system was cooled from outside the vessel to gel and solidify the coacervate wall. At 10° C, 8 parts of a 10% aqueous solution of the hardener obtained in Synthesis Example 6 and 30 parts of a 5% carboxymethyl cellulose sodium salt aqueous solution were added thereto. Then, a 10% sodium jhydroxide aqueous solution was added dropwise thereto to adjust the pH of the solution to 10, followed by increasing the temperature to 50° C to complete the microencapsulation.

The thus obtained mirocapsules possesses a heat resistance of 98% and were excellent in strength. They are useful for pressure-sensitive copying papers.

While the invention has been described in detail and with reference to specific embodiments thereof, it will be apparent to one skilled in the art that various changes and modifications can be made therein without departing from the spirit and scope thereof.

What is claimed is:

1. In a process for producing microcapsules by complex coacervation to microencapsulate hydrophobic oil droplets within a gelled coacervate wall, said process utilizing as the coacervate wall material at least two hydrophilic colloids having opposite electric charges and being ionizable in water, at least one of said colloids being gellable, the improvement comprising
    a. subsequently to the formation of said gelled coacervate wall encapsulating said hydrophobic oil droplets, hardening said coacervate wall by contacting said coacervate wall with an oxidation product of a polysaccharide and
    b. during said hardening stage, adjusting the pH of the system to an alkaline value of about 7 or above.

2. The process of claim 1, wherein said oxidation product of said polysaccharide is the reaction product obtained on oxidizing at least about 20% of the secondary alcohol groups in said polysaccharide to aldehyde groups.

3. The process of claim 2, wherein said oxidation product of said polysaccharide is a glucan, a fructan, a mannan, a xylan, a galacturonan, a mannuronan, an N-acetylglucosamine derivative, a heteroglycan, a trihetroglycan, or a tetraheteroglycan.

4. The process of claim 3, wherein said polysaccharide is gum arabic, amylopectin, cellulose sulfate, starch, laminarin or alginic acid.

5. The process of claim 1, wherein said oxidation product of said polysaccharide is present in an amount of at least about 3% by weight based on the weight of said colloid which is gellable.

6. The process of claim 1, wherein said hydrophilic colloids having opposite electrical charges are gelatin, saccharides, gums or maleic anhydride copolymers.

7. a process for producing microcapsules which comprises emulsifying a hydrophobic oil in an aqueous solution of at least one first hydrophilic colloid ionizable in water to form an oil-in-water type emulsion and admixing an aqueous solution of at least one second hydrophilic colloid which is ionizable in water and which has an opposite electric charge to said first hydrophilic colloid or emulsifying said hydrophobic oily solution in an aqueous solution of at least two hydrophilic colloids having opposite electric charges to form an oil-in-water type emulsion; causing said hydrophilic colloids to coacervate around the emulsified oil droplets by adding water to the oil-in-water emulsion and/or adjusting the pH of said oil-in-water emulsion; cooling said oil-in-water emulsion to cause the gellation of the coacervate wall, and hardening said coacervate wall by adjusting the pH to an alkaline pH of about 7 or above in the presence of an oxidation product of a polysaccharide as a hardening agent.

8. The process of claim 7, wherein said oxidation product of said polysaccharide is the reaction product obtained on oxidizing at least about 20% of the seconary alcohol groups in said polysaccharide to aldehyde groups.

9. The process of claim 8, wherein said oxidation product of said polysaccharide is a glucan, a fructan, a mannan, a xylan, a galacturonan, a mannuronan, an N-acetylglucosamine derivative, a heteroglycan, a triheteroglycan, or a tetraheteroglycan.

10. The process of claim 9, wherein said polysaccharide is gum arabic, amylopectin, cellulose sulfate, starch, laminarin or alginic acid.

11. The process of claim 7, wherein said oxidation product of said polysaccharide is present in an amount of at least about 3% by weight based on the weight of said colloid which is gellable.

12. The process of claim 7, wherein said hydrophilic colloids having opposite electrical charges are gelatin, saccharides, gums or maleic anhydride copolymers.

* * * * *